United States Patent Office 3,121,257
Patented Feb. 18, 1964

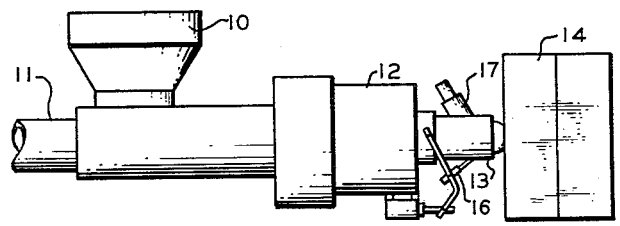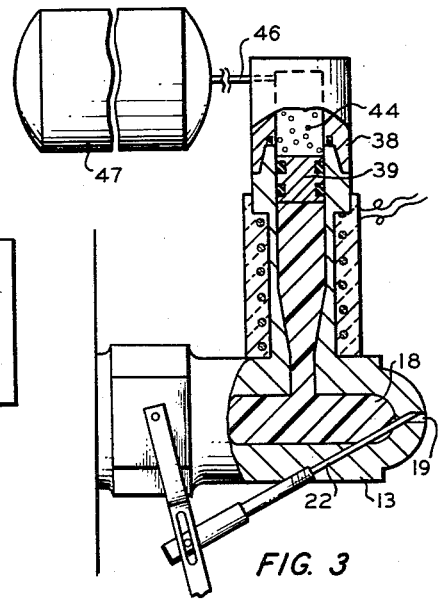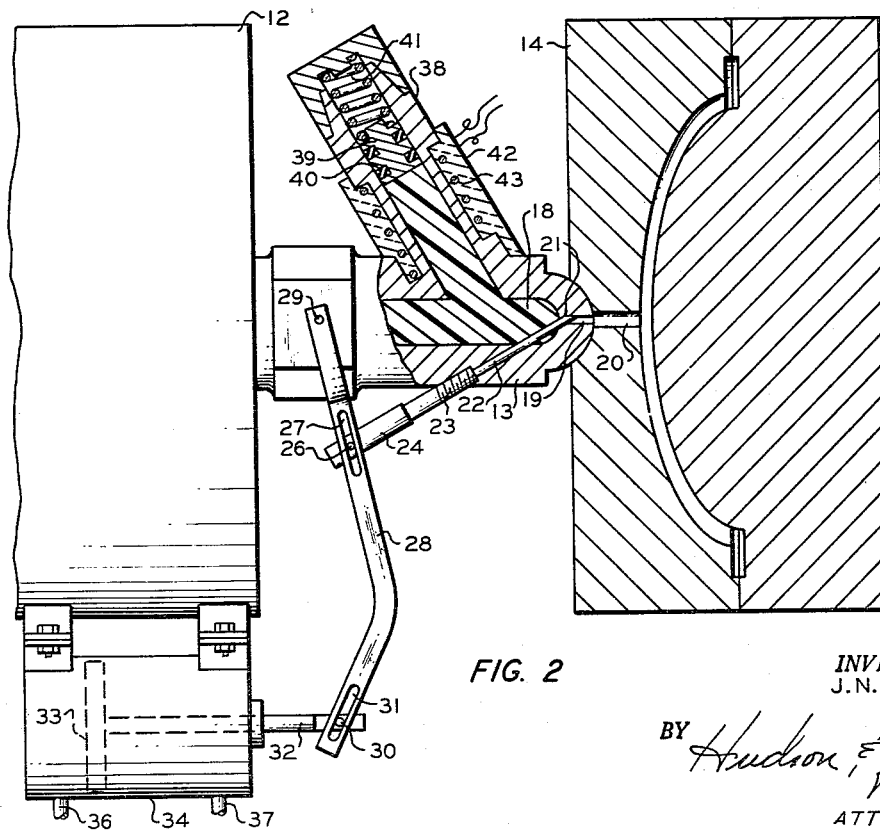

3,121,257
INJECTION MOLDING THERMOPLASTIC
POLYMERS
John N. Scott, Jr., Bartlesville, Okla., assignor to Phillips
Petroleum Company, a corporation of Delaware
Filed Feb. 27, 1959, Ser. No. 796,045
2 Claims. (Cl. 18—30)

This invention relates to a method and apparatus for injection molding thermoplastic polymers. In one of its more specific aspects it relates to an improved nozzle which permits injection of molten polymer into a mold at high speed.

Conventional molding apparatus of the injection type usually includes a heating cylinder having associated therewith an injection plunger or piston. The plunger reciprocates in the bore of the heating cylinder to permit the solid plastic material being molded to enter the cylinder on the withdrawal stroke of the plunger. On the compression stroke the plastic material is forced through a long heating chamber containing a plurality of restrictions and enters a nozzle at the end of the heating cylinder and then passes through runners or sprues into the mold cavity. In an ideal injection molding operation the mold cavity would be filled instantaneously with molten resin uniform in temperature and pressure and this molten material would then be cooled at a uniform rate. This ideal situation is difficult to approach with conventional molding equipment. The long channels of the heating chamber with its restrictions, the nozzle and the runner systems of the mold produce considerable pressure drop in the stream of molten polymer and reduces the rate of speed of injection considerably lower than optimum. These heating chamber restrictions are necessary in order to insure complete melting and mixing of the polymer. Since the mold is filled less rapidly than desired, the molten material flowing to the extremity of the mold tends to be cooled as it passes over the mold surface. Considerable effort has been directed toward increasing the speed of injection by replacing low volume hydraulic oil pumps with high volume pumps operating the injection ram. In other instances the speed of injection has been increased by the use of gas accumulators in the hydraulic line which enable high pressures to be developed in the hydraulic system so that a large volume of oil is available for high speed injection when it is desired to fill the mold. Both of these approaches to the problem have their disadvantages, however. Large volume pumps are very expensive and inefficient. The pressure accumulation system in the hydraulic line is limited mainly to small machines because of the large volume of the gas that must be compressed to move all of the oil that operates the injection cylinder.

It is desirable to avoid holding thermoplastic polymer at the high temperature necessary to render it fluid for prolonged periods as many polymers have a tendency to change their physical characteristics, such as by crosslinking, at elevated temperatures.

I have according to my invention provided a method and apparatus which permits an injection molding operation to be performed with a relatively high rate of polymer injection. At the same time it is not necessary to maintain polymer in the molten state for a prolonged period of time. According to my invention a pressure loading system is incorporated near the nozzle end of the heating cylinder of an injection molding machine and the molten polymer is accumulated in a chamber in unrestricted communication with the nozzle at relatively high pressure. The molten polymer is accumulated in this manner while a valve in the end of the nozzle is closed. When the valve is opened the polymer is quickly forced into the mold cavity with a minimum of pressure drop.

When employing my invention the molding cycle has the following sequence: First, the nozzle shut-off valve goes into the closed position and the injection ram moves forward to compress loose pellets of thermoplastic polymer forcing them into the heating cylinder where they are melted. After being forced through the restrictions in the heating cylinder, the molten polymer passes into a separate chamber or cylinder mounted at the nozzle. The molten polymer is forced into this chamber in opposition to a high back pressure which is provided by pressurized gas, a spring of proper strength or some similar means for heavily weighting a piston mounted within the cylinder. This part of the operation can be slow since some time is required for the previously injected item to cool and be ejected from the mold. With an empty mold in position the nozzle shut-off valve is opened and the molten resin is allowed to be ejected very rapidly from the accumulation chamber into the mold. Since there are no restrictions between the accumulation chamber and the nozzle there is a minimum of pressure drop in the polymer flowing into the mold. Preferably the back pressure in the accumulation chamber is provided by the gas under high pressure and in communication with a reservoir of such size that the pressure therein is affected to a relatively small degree by the movement of polymer in and out of the accumulation chamber. The accumulation chamber should be sized to accommodate at least about the amount of molten polymer required to fill the mold. By using my invention the disadvantages of the restrictions required in the heating cylinder of the injection molding press are eliminated.

It is an object of my invention to provide an improved method and apparatus for injection molding thermoplastic polymers. Another object is to provide an injection molding method and means whereby molds can be filled with molten resin more quickly than heretofore possible. Another object of my invention is to increase the pressure in the molten polymer at the nozzle throughout the injection portion of the molding cycle. Another object is to provide a nozzle which is adaptable to existing equipment and which will enable increased injection speeds. Other objects, advantages and features of my invention will be apparent from the following discussion and drawings in which:

FIGURE 1 is an elevation drawing of an injection molding press showing the mold in position to receive the charge of molten polymer from the nozzle;

FIGURE 2 is an elevation drawing partly in section of the nozzle of my invention showing the cooperation of the nozzle shut-off valve and accumulation chamber; and FIGURE 3 is another drawing partly in section of my improved nozzle showing the use of a pressurized gas to provide the necessary back pressure in the accumulation chamber.

The materials which can be molded with the method and apparatus of my invention can be broadly defined as thermoplastic synthetic resins. While my invention can be applied advantageously to a broad class of thermoplastic polymers it is of particular advantage in the molding of high density, highly crystalline solid polymers of 1-olefins. Such polymers require high injection molding pressures and the pressure drop which is developed within the restrictions of the heating cylinder is especially troublesome in reducing the speed of injection. These high density, highly crystalline solid polymers often have an inherent viscosity of at least 0.8, preferably an inherent viscosity between 1.2 and about 10, as determined from a solution of 0.1 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. These polymers soften at a temperature generally in the range of about 250–300° F. depending upon their density and crystallinity. Generally, the temperature for molding such polymers is in the range of about 300–450° F.

Highly crystalline polymers having the above-described properties are preferably produced by the method described in U.S. Patent No. 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including 6 carbon atoms per molecule, such as propylene, 1-butene, and 1-pentene.

While is is preferred to use in the practice of this invention polymers produced in accordance with the Hogan and Banks process, it is to be understood that polymers produced by other methods can also be employed. For example, a polymer which can be advantageously used can be produced by contacting an olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a group IV metal, such as titanium tetrachloride. Although it is usually preferred to utilize the above-mentioned polymers, it is to be realized that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

To more fully exlain my invention reference is made to the drawings. In FIGURE 1 an injection molding press is shown in simplified form having a hopper 10 to receive pellets of solid thermoplastic polymer and an injection ram 11 which forces the polymer pellets through a heating cylinder 12. Within heating cylinder 12 are a plurality of restricted passages which cause the polymer to thoroughly mix as it passes therethrough and force the polymer to contact the walls of the heating cylinder so that the polymer is completely molten by the time it leaves this cylinder. The molten polymer is forced from heating cylinder 12 into nozzle 13 and then passes into the mold 14. In this view there is shown according to my invention incorporated with the nozzle 13 a shut-off valve 16 and an accumulation chamber 17. These features are shown in greater detail in FIGURE 2.

In FIGURE 2 nozzle 13 is shown, partly in section, fastened to heating cylinder 12. Within nozzle 13 is an axial channel 18 which terminates in a narrow passageway 19 in the end of the nozzle. The sprue or gate 20 of the mold 14 is positioned to register with the passageway 19 so that the molten polymer is forced from the nozzle into the gate of the mold. Passageway 19 has an angular entrance 21 which forms the seat for valve stem 22. Valve stem 22 is positioned at an actuate angle to the longitudinal axis of channel 18 and enters nozzle 13 through a threaded seal 23. Valve stem 22 is fastened to slide member 24 which carries a pin 26 movably mounted in slot 27 of yoke 28. Yoke 28 is pivoted on the nozzle by pin 29 and is movably connected by pin 30 in slot 31 to piston rod 32. Piston rod 32 is fixed to piston 33 mounted in cylinder 34. By the passage of fluid into cylinder 34 through line 36, piston 33 can be forced forward causing valve stem 22 to seat in the opening 21 of passageway 19 thereby closing this passageway. Likewise, when fluid is forced into cylinder 34 through line 37 and vented through line 36, valve stem 22 is removed from passageway 19 thereby opening this passageway. Such a valve is described in greater detail in my copending application with coinventor Doyle L. Alexander, Serial No. 772,841, filed November 10, 1958.

Other valve means which can be used to close the passageway between the main channel of nozzle 13 and the gate of the mold can be employed with my invention. I prefer, however, to use the type of valve above-described and shown in FIGURE 2 because this valve can be operated in opposition to relatively high nozzle pressures without tending to bind within the passageway 19. This is highly important because my invention enables extremely high pressures to be developed and maintained at the nozzle throughout the injection portion of the molding cycle during which time the valve is opened and closed.

According to my invention I have provided in cooperation with the nozzle shut-off valve an accumulation cylinder 38 which is in unrestricted communication with the channel 18 of nozzle 13. By unrestricted communication as employed in this description and in the claims I refer to an opening through which the pressure drop caused by the passage of molten polymer therethrough is negligible compared with the pressure drop of the polymer passing through the exit passageway 19 in the nozzle and the gate 20 and runners of the mold. Generally the accumulation chamber and opening connecting to the nozzle bore should be at least about ¾ inch in diameter. Of course the accumulation chamber can be much larger and is sized depending upon the size of the injection shot of the press. In this way the pressure drop of the polymer as it is forced into the mold is reduced to a minimum and for all practical purposes is the only pressure drop required to fill the mold itself. The high pressure drop in the heating cylinder with its many restrictions is eliminated so far as its effect upon the time of filling the mold is concerned.

Within accumulation cylinder 38 is a movable piston 39 containing sealing rings 40 which prevent molten polymer from flowing past piston into the upper part of the cylinder. Mounted in the upper end of the cylinder of FIGURE 2 is a spring 41 which bears against piston 39 and provides a back pressure against the polymer tending to enter the cylinder 38. While a spring is shown in this embodiment it should be understood that other means for providing a sufficient back pressure can be employed. It is preferred that a pressurized gas be used since by such means pressure developed upon the molten polymer in the nozzle can be maintained relatively constant during the injection cycle. In order to prevent cooling of the polymer in the accumulation chamber, insulation 42 and heating means 43, such as resistance wires, are employed as shown.

Referring to FIGURE 3 the preferred means of pressurizing accumulation chamber is shown with a gas 44 in the upper portion of accumulation chamber 38. The cylinder 38 is shown connected by conduit 46 to a gas pressure tank 47 which can be located at a remote position wherever convenient. Tank 47 is considerably larger than is shown in the drawing. It is desired that pressure tank 47 be of such size in relation to the volume of cylinder 38 that the movement of piston 39 within the cylinder has little effect upon pressure of the gas. In this manner as soon as the injection ram has developed enough pressure in the nozzle 13 to overcome the back pressure of gas 44, cylinder 38 will fill with molten polymer as shown in FIGURE 3. The volume provided within cylinder 38 for accumulation of molten polymer should be at least sufficient to fill the mold. Then when valve stem 22 is removed from its seat in passageway 19 the pressure of the gas in tank 47 forces piston 39 toward the channel 18 and ejects the molten polymer from cylinder 38 through channel 18 and passageway 19 into the mold. This ejection takes place with relatively little (for example less than about 5 percent) change in pressure in tank 47. It is preferred that the injection cylinder be mounted at an acute angle to channel 18 and nozzle 13, extending rearwardly as shown in FIGURE 2, at an angle preferably about 30 to 60 degrees. Accordingly there is even less drop in pressure of the molten polymer leaving the accumulation chamber and passing along channel 18 and passageway 19 into the mold.

It is highly desirable in the practice of my invention to position the accumulation chamber as close to the end of the nozzle as possible and preferably this chamber should not be more than 6 to 8 inches behind the nozzle shut-off valve. In some applications where the shut-off valve is mounted within the nozzle, closing channel 18 rather than passageway 19, the accumulation chamber is positioned immediately upstream from the shut-off valve but downstream from the heating chamber with its many restrictions. As can be seen from the above discussion, a primary benefit of my invention is the elimination of the effect of the restrictions in the heating chamber upon injection molding time.

Advantages of this invention are illustrated by the following example. The materials and their properties and other specific conditions are presented as being typical and should not be construed to limit the invention unduly.

*Example*

Polyethylene having a density of 0.962 and a melt index of 0.9 is molded in an extrustion molding press by passing the polyethylene pellets into the heating chamber and compressing them with a ram pressure of 20,000 p.s.i. The polyethylene is melted and forced into an extrusion nozzle and into an accumulation chamber against a back pressure of compressed air at 20,000 p.s.i. Polyethylene is forced into the accumulation chamber until 20 ounces of molten polymer is accumulated therein. The nozzle bore is ¾ inch in diameter and the accumulation chamber joins the nozzle at a 45 degree angle inclined toward the heating chamber. The accumulation chamber has an internal diameter of 2.5 inches and a length of 10 inches and connects through a bore 1 inch long and ¾ inch in diameter to the bore of the nozzle 3 inches from the nozzle tip which is closed by a valve stem entering passageway of the nozzle tip at an angle of 35 degrees to the horizontal axis of the nozzle. While continuing to apply pressure with the ram in the heating chamber, the mold is placed into position and the valve is opened whereupon 20 ounces of molten polymer is forced from the accumulation chamber into the mold in about 2 seconds. The valve is then closed and the mold removed. The injection cycle begins again by forcing more molten polymer into the accumulation chamber. During the injection of polymer into the mold the pressure in the nozzle is maintained at about 19,000 to 20,000 p.s.i.

Repeating the above procedure with a nozzle not equipped with the accumulation chamber of my invention the valve is closed and a pressure of 20,000 p.s.i. is built up within the nozzle at which time the valve is opened and the force of the ram in the heating cylinder forces molten polymer into the mold. The pressure in the nozzle falls to 10,000 p.s.i. during injection and the time to fill the mold is 5 seconds.

Melt index for the polyethylene of the example is determined by ASTM D-1238 procedure using five 2-minute extruded samples. Density is determined by placing a pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown on the scale is taken as the specific gravity.

As illustrated by the above examples the time to fill a mold can be reduced considerably when using the accumulation chamber according to my invention. The advantage gained is not in the actual time saved inasmuch as the injection phase of the molding cycle is a relatively small part of the total operation. However, by reducing time to fill the mold to about 1 or 2 seconds I am able to improve the quality of the molded article because the cooling of the molten plastic within the mold is much more uniform. Furthermore, the occurrence of voids within the molded article because of premature cooling of the polymer is virtually eliminated. Generally, the time with which the mold can be filled is reduced by about 50 percent when practicing according to my invention. It should further be appreciated that the solution to this molding problem which I have presented is a relatively simple and inexpensive one to put into effect and the nozzle of my invention can be adapted to any conventional injection molding machine without the necessity of major modifications in the hydraulic system.

As will be evident to those skilled in the art, various modifications of this invention can be made, or followed, in the light of the foregoing disclosure and discussion, without departing from the spirit or scope thereof.

I claim:

1. In injection molding apparatus having means for receiving solid polymer, means for heating said polymer to a molten state and means for forcing said polymer while in a softened and molten state through a plurality of restricted passages and thence into a nozzle containing an axial channel out of said nozzle through a terminal passageway into a mold, the improvement comprising in combination, a valve stem passing through a seal in the wall of said nozzle and seating in said passageway to close same, said valve stem forming an acute angle with said channel and positioned so that pressure in said channel tends to seat said valve, means for longitudinally moving said valve stem to open and close said passageway, a cylinder fastened at one end to said nozzle and closed at the other end, a biased piston movable entirely within said cylinder and dividing same into a first volume in unrestricted communication with said channel adjacent said passageway, and a second volume sealed from said first volume by said piston and communicating with a high gas pressure-vessel of such a size and pressure that the movement of said piston in said cylinder has relatively little effect upon the pressure in said vessel and second volume, said first volume being at least about equal to the volume of said mold, and heating means disposed about said cylinder.

2. Apparatus according to claim 1 wherein said cylinder forms an acute angle with said nozzle so that polymer passing from said first volume is moving toward said passageway.

References Cited in the file of this patent
UNITED STATES PATENTS

| | | |
|---|---|---|
| 2,478,013 | Roddy | Aug. 2, 1949 |
| 2,668,325 | Goodwin | Feb. 9, 1954 |
| 2,737,686 | Harkenrider | Mar. 13, 1956 |
| 2,831,214 | Eyles et al. | Apr. 22, 1958 |
| 2,862,241 | De Mattia | Dec. 2, 1958 |
| 2,950,501 | Harkenrider | Aug. 30, 1960 |